(12) United States Patent
Beaujot et al.

(10) Patent No.: US 8,538,716 B2
(45) Date of Patent: Sep. 17, 2013

(54) METHOD AND APPARATUS FOR CALIBRATING SEEDERS

(75) Inventors: Patrick M. Beaujot, Langbank (CA); Brian F. Dean, Langbank (CA); David R. Duke, Langbank (CA); Bruce W. Wilton, Langbank (CA)

(73) Assignee: One Pass Implements Inc., Langbank (CA)

( * ) Notice: Subject to any disclaimer, the term of this patent is extended or adjusted under 35 U.S.C. 154(b) by 0 days.

(21) Appl. No.: 13/453,505

(22) Filed: Apr. 23, 2012

(65) Prior Publication Data

US 2012/0209425 A1   Aug. 16, 2012

Related U.S. Application Data

(62) Division of application No. 12/430,682, filed on Apr. 27, 2009, now Pat. No. 8,170,825.

(60) Provisional application No. 61/048,265, filed on Apr. 28, 2008.

(51) Int. Cl.
*G01D 18/00*   (2006.01)
*G01G 23/01*   (2006.01)

(52) U.S. Cl.
USPC ............................. 702/85; 702/101; 702/173

(58) Field of Classification Search
USPC ...... 702/85, 94, 95, 101, 173, 174; 83/425.2; 111/174; 700/240; 701/45, 50
See application file for complete search history.

(56) References Cited

U.S. PATENT DOCUMENTS

| | | | |
|---|---|---|---|
| 6,584,920 B1 | 7/2003 | Cresswell | |
| 6,851,377 B2 * | 2/2005 | Mayerle et al. | 111/174 |
| 2006/0271262 A1 | 11/2006 | McLain, III | |

FOREIGN PATENT DOCUMENTS

CA   2311698   12/2001

* cited by examiner

*Primary Examiner* — John H Le
(74) *Attorney, Agent, or Firm* — Bennett Jones LLP

(57) ABSTRACT

A calibration device for calibrating a metering system that dispenses a product to a seeder towed by a farm vehicle is provided for obtaining and maintaining a desired rate of delivery of the product from the seeder. The calibration device includes a first console port positioned at or near the farm vehicle and a second console port at or near the metering system, each operative to receive at least one a calibration console for calibrating the rate of product delivery and adjust the metering system accordingly.

15 Claims, 5 Drawing Sheets

METHOD AND APPARATUS FOR CALIBRATING SEEDERS

FIELD OF THE INVENTION

The present invention relates generally to a method and apparatus for calibrating a metering system for dispensing a product such as seed, fertilizer, and the like from a seeder such as an air seeder at a desired rate.

BACKGROUND OF THE INVENTION

Grain drills or seeders such as air seeders for crop farming are typically mounted on a trailer towed behind a tractor or other farming machinery. An air seeder generally comprises a toolbar having ground openers mounted thereon for receiving and delivering seed and/or seed/soil supplement product such as fertilizer into or on the ground. The seeder may include at least one seed and/or seed/soil supplement product frame-mounted hopper or tank for storing seed and/or supplement product in granular form to be planted or spread over farmland. In the alternative, a separate product dispensing cart (e.g., an air cart) can be towed behind the seeder for holding and dispensing product to the seeding tools of the seeder. Supplement product includes, but is not limited to, fertilizer, inoculants, herbicide, etc. The seed and supplement product will generally be referred to herein as product.

Air seeders typically employ a metering system for dispensing product from the hopper and a pneumatic distribution system for delivering the metered product to the soil. Air seeders that can separately meter seed and supplement product are available having distribution systems that can apply both seed and supplement product such as fertilizer simultaneously to a field.

A metering system for an air seeder generally includes a volumetric meter that may be geared to the wheels of the air seeder trailer or product dispensing cart as known in the art to dispense a fixed volume of product per unit of linear distance traveled by the air seeder. A volumetric meter typically includes either augers or a fluted cylinder (meter roller) mounted at the bottom of the hopper, product from the hopper filling the interstitial spaces thereon. Rotating the volumetric meter against a screed measures out the granular product in units of interstitial volumes. Thereafter, the product so dispensed is allowed to enter the pneumatic distribution system. Thus, the volumetric meter is driven by a ground wheel such that the meter turns proportionally to the ground wheel and the rate of delivery of product will remain constant regardless of the speed of the seeder.

The pneumatic distribution system generally utilizes air under pressure to provide at least one air stream that flows through the pneumatic distribution system and carries the product to be deposited in the soil, typically by seed boots. Product dispensed by the metering system is first introduced into the air stream at a primary distribution manifold. Fluidized product is carried under air pressure by primary distribution lines to a group of secondary distribution manifolds ("headers"), which in turn distribute product through secondary distribution lines to individual seed boots mounted behind ground openers on the tilling implement. The metering of the product dispensed may evenly deliver the product along a furrow made by a corresponding opener of the tilling equipment.

Seeding at the proper rate and desired depth are essential for obtaining maximum yield of crop. However, the size of seed and supplement product will vary between varieties and even the size of seed of the same variety may vary from one year to the next. This requires that a seeder metering system be calibrated so that the correct amount of seed is planted. Because most metering systems are based on a volume displacement, if one lot of seed varies in size and weight from another, two different amounts or number of seeds will be metered if the meter settings are not changed.

Air seeder manufacturers generally include a calibration method in their operator's manual. Such calibration generally requires collecting a unit of product from each meter and weighing the unit of product. This is routinely done when the seeder is stationary by providing a handle or crank for rotating the volumetric meter against the screed a given number of times for a particular area and then collecting the product dispensed in a bag, pail, catch box or the like. Such crank can be hand operated or operate using an electric or hydraulic motor. The number of turns of the meter is generally determined by a sensor located at the meter. The collected product is then weighed using a scale. The average product per square foot or product per lineal foot is then calculated and the metering system is set accordingly. An example of a seeder calibration apparatus and method that uses a hydraulic motor is described in Canadian Patent No. 2,311,698, incorporated herein by reference.

Most seeders are equipped with a calibration console (monitor/control) having an input device (e.g., key pad) for inputting data such as the weight of the unit of product collected and a microprocessor that will automatically perform the calculations for each metered product and provide the operator with the product application rate (weight of product dispensed per unit of area covered by the seeder). The metering system can then be adjusted accordingly to vary the rate of delivery of a product to be dispensed. Unfortunately, such calibration consoles are only located in the cab of the tractor. It is not uncommon for an operator to have to calibrate a metering system more than once during a given operation. Furthermore, if dispensing more than one product, such calibrations must be done for each metered product.

Thus, depending upon the number of times an operator is required to calibrate a particular product and the number of individual products being dispensed in a given operation, the operator may need to make several trips to the tractor cab from the seed cart where the metering system is located while remembering the exact weight of the calibrated product. This is very time consuming and leaves a potential for errors. Some of the products to be applied are expensive and thus an error in application rate can be very costly.

Therefore, there is a need in the crop farming industry for a method and apparatus for calibrating a metering system that is convenient for the operator and provides less room for operator error.

SUMMARY OF THE INVENTION

In accordance with one aspect of the application, a calibration device for calibrating a metering system that dispenses a product to a seeder towed by a farm vehicle to obtain and maintain a desired rate of delivery of the product from the seeder is provided, comprising:

an electrical harness that electrically connects the farm vehicle, the seeder and the metering system, said electrical harness having a first console port at a first position, the first position at or near the farm vehicle and a second console port located a second position, the second position at or near the metering system; and at least one a calibration console having an input device and operative to calculate the rate of delivery of the product based on the weight of a unit of product;

whereby the at least one calibration console can be plugged into the second console port when the weight of the unit of product is being measured and inputted into the calibration console via the input device to calibrate the rate of product delivery and adjust the metering system accordingly and/or can be plugged into the first port when operating the farm vehicle to ensure the rate of product delivery is maintained during seeding.

In one embodiment, the calibration device comprises two calibration consoles, one plugged into the first port and one plugged into the second port. In another embodiment, only one calibration console is provided which can be moved by the operator to the first console port or the second console port accordingly.

In accordance with another aspect of the present application, an apparatus for calibrating a metering system for dispensing a desired volume of at least one product to a seeder towed by a farm vehicle for application of the product from the seeder in or on the ground, said metering system comprising at least one rotatable meter having a meter roller attached to a meter drive shaft to rotate the meter in relation to the distance traveled, is provide, comprising:

a calibration console having an input device and a microprocessor located at or near the metering system;
a means for rotating the rotatable meter to dispense a weight of product from the meter;
a container for collecting the weight of product, said weight of product to be measured by an operator of the apparatus and inputted into the calibration console by the operator; and
a first sensor operative to determine the number of rotations of the rotatable meter required to dispense the weight of product and operatively connected to the calibration console to input the number of rotations into the calibration console;

whereby when the weight of the product is entered into the calibration console the microprocessor calculates the dispensing rate of the product, being weight of product dispensed per rotation of the rotatable meter.

In one embodiment, the apparatus further comprises:
a second sensor operative to measure a distance traveled by the seeder and operatively connected to the calibration console to input the distance traveled into the calibration console;

whereby, in addition to calculating the dispensing rate of the product, the microprocessor calculates the application rate of the product, being the weight of the product dispensed per unit of area covered by the seeder.

In accordance with another aspect of the present application, a method for an operator to conveniently calibrate a metering system that dispenses a product to a seeder towed by a farm vehicle for application of the product from the seeder into or on the ground is provided, comprising:

providing in a first position a calibration console having an input device and a microprocessor operative to calculate the dispensing rate and application rate of the product based on the weight of a unit of product, the first position at or near the metering system;
calibrating the meter system by:
for each of the at least one product, dispensing the unit of the product from the metering system into a container and weighing the unit of product dispensed; and
inputting the weight of the unit of product into the calibration console located at the first position using the input device and calculating the dispensing rate of the product or the application rate of the product or both.

The ability to enter the weight of the unit of product dispensed by a particular meter directly to a calibration console located near the metering system will allow the operator to quickly and efficiently determine the appropriate setting of the metering system to obtain the necessary number of rotations of the meter necessary to dispense the fixed volume (weight) of product per unit of linear distance traveled by the seeder. Other advantages may be derived from the quick turnaround time in setting the metering system, in particular when more than one meter is being used to dispense more that one product.

BRIEF DESCRIPTION OF THE DRAWINGS

The features and advantages of the invention will become more apparent from the following detailed description of the embodiment with reference to the attached diagrams wherein:

FIG. 3a is a front perspective view of a meter commonly found in a metering system for metering granular product having a meter roller and a primary distribution manifold;

FIG. 3b is a side view of the meter shown in FIG. 3a;

It will be noted that in the attached diagrams like features bear similar labels.

DETAILED DESCRIPTION OF THE EMBODIMENTS

The detailed description set forth below in connection with the appended drawings is intended as a description of various embodiments of the present invention and is not intended to represent the only embodiments contemplated by the inventors. The detailed description includes specific details for the purpose of providing a comprehensive understanding of the present invention. However, it will be apparent to those skilled in the art that the present invention may be practiced without these specific details.

Figure 1:
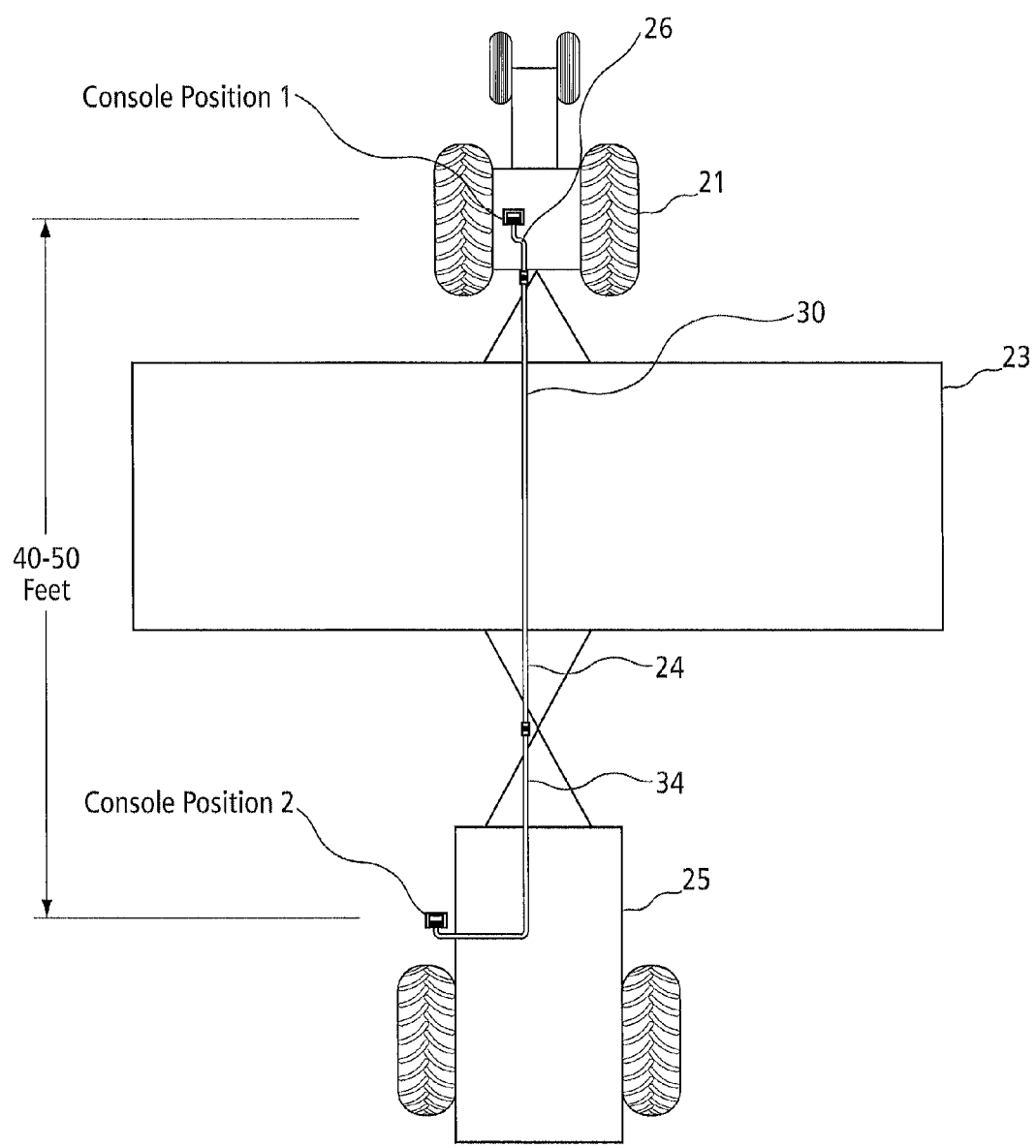
FIG. 1 is an electrical overview of an embodiment of the invention.
Figures 3A, 3B:
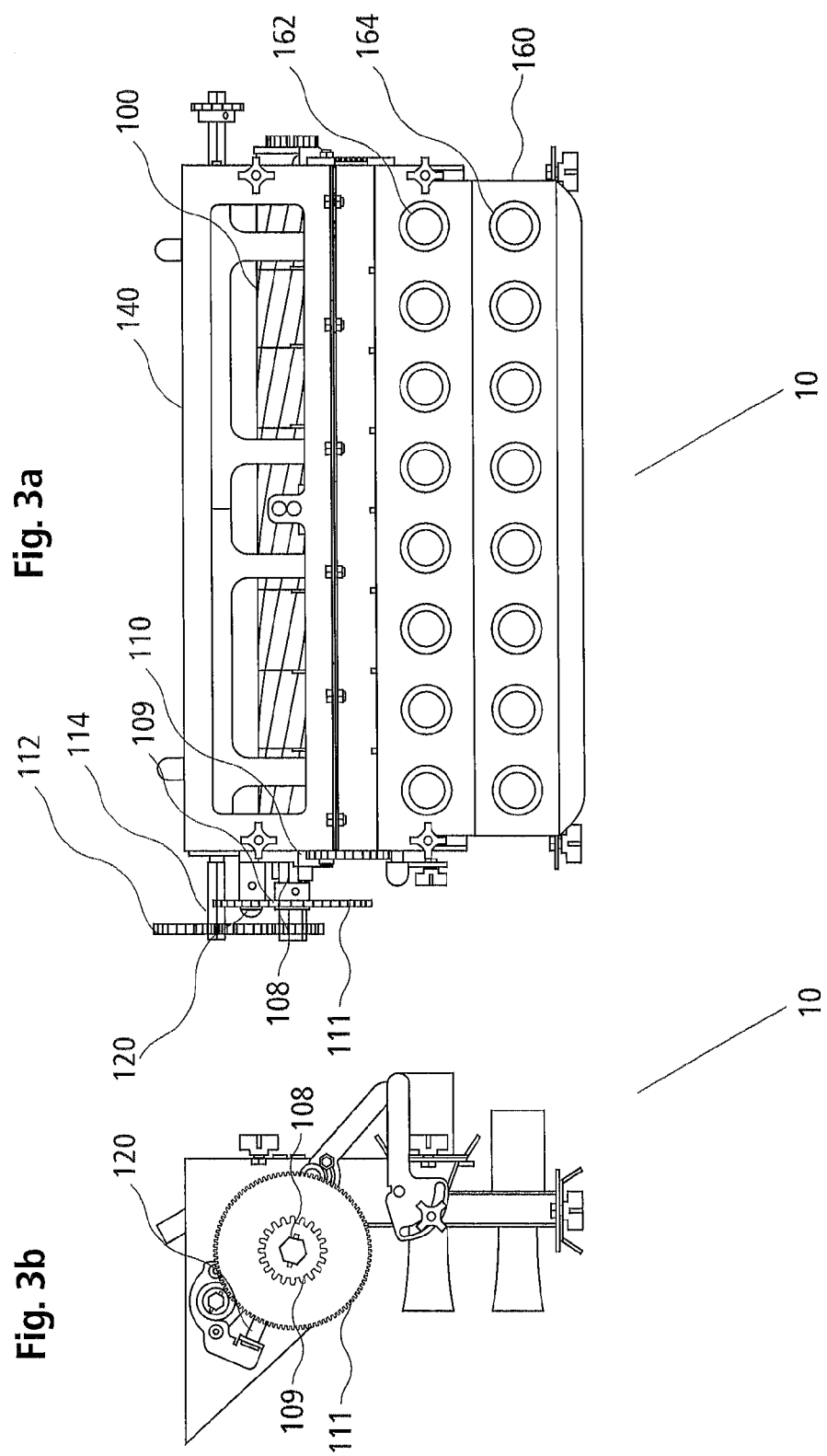

FIG. 1 is an electrical overview of an embodiment of the invention. FIG. 1 shows tractor 21 and calibration console position 1 located in the cab of tractor 21. Tractor 21 tows toolbar 23, which toolbar may comprise a plurality of individual ground openers (not shown), collectively referred to herein as a seeder. The seeder in turn tows air cart 25, which air cart comprises a metering system having at least one meter, for example, as shown in FIG. 3a and as described in more detail below. Air cart 25 further comprises at least one tank or hopper (not shown) for carrying at least one product such as seed or fertilizer.

As can be seen in FIG. 1, console position 1 is electrically connected to console position 2 by electrical harness 24, which may comprise tractor harness 26, toolbar harness 30 and air cart harness 34. The distance between the air cart 25 and the tractor 21 can be anywhere from 40-50 feet or more and thus the distance an operator must travel between the air cart and tractor cab is significant, in particular when calibrating a metering system comprising more that one meter.

Figure 2:
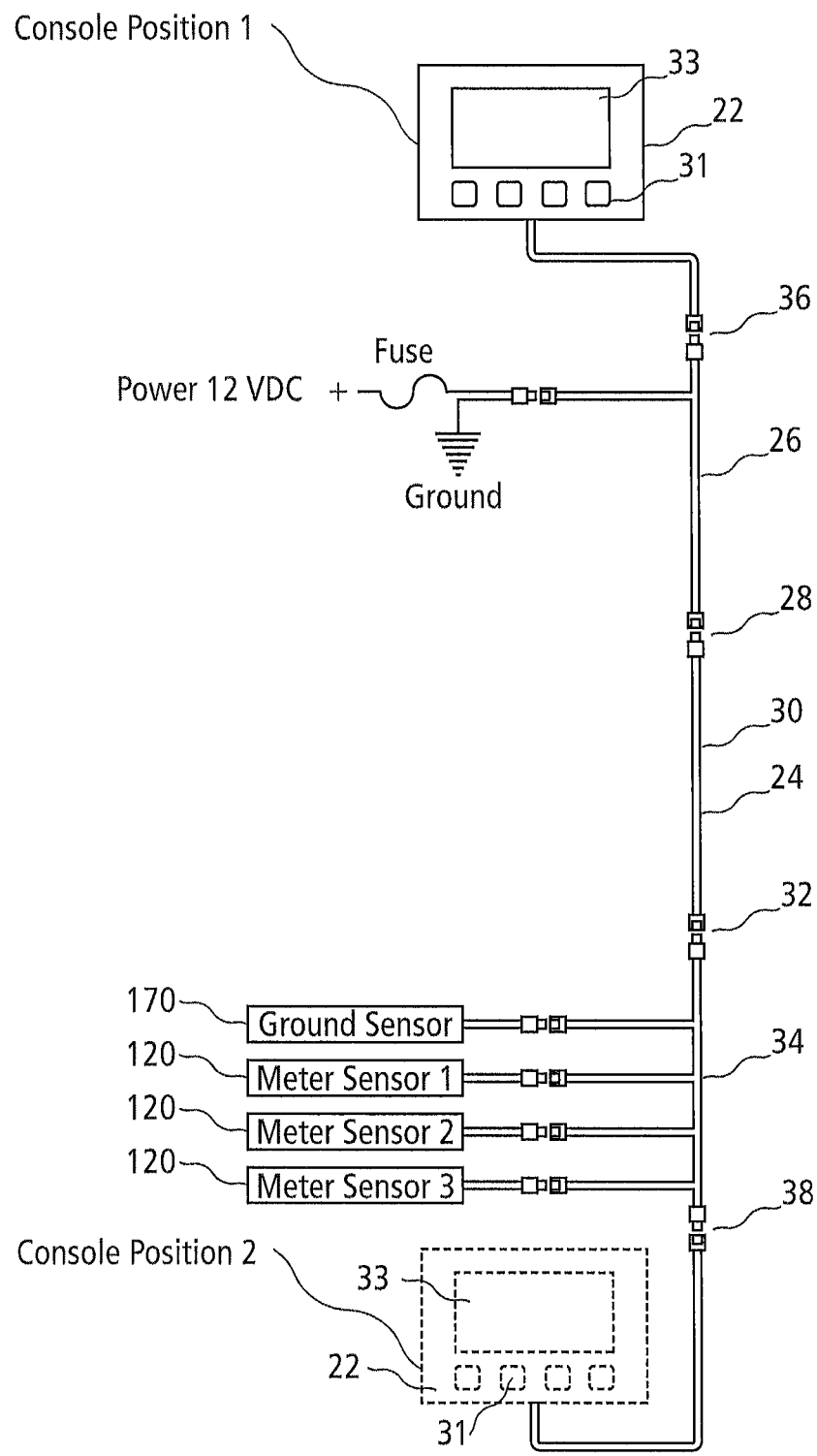
FIG. 2 shows an electrical harness of an embodiment of the invention.

With reference now to FIG. 2, an embodiment of the invention is shown in more detail. Calibration console 22 comprises input pad 31, screen 33 and an internal microprocessor which can be calibrated and then used to monitor the feed rate and/or dispensing rate of the product. In one embodiment, the calibration console 22 can also be used to adjust the feed rate of the product. As previously mentioned, electrical harness 24 may comprise tractor harness 26, toolbar harness 30 and air cart harness 34, whereby tractor harness 26 is attached to toolbar harness 30 via tractor hitch junction 28 and toolbar harness 30 is attached to air cart harness 34 via air cart junction 34. At the tractor end of electronic harness 24 is console port 1 (36) and at the air cart (or metering system) end of electronic harness 24 is console port 2 (38). Thus, calibration console 22 can be moved to either position.

Attached to air cart harness 34 is at least one meter rotation sensor 120, the number of meter rotation sensors corresponding to the number of meters there are in the metering system. As will be explained in more detail below, meter rotation sensor 120 senses the number of rotations of each meter that is rotated during metering calibration. The meter may be rotated via a meter roller shaft that is either manually rotated by means of a crank or hydraulically or electrically rotated as is known in the art. Thus, meter rotation sensor 120 is operably connected to calibration console 22 having a microprocessor so that the number of rotations of the rotatable meter needed to dispense a particular weight (or unit) of product is automatically inputted into the calibration console.

In some embodiments, a second sensor is provided, ground sensor 170. In one embodiment, ground sensor 170 senses the distance traveled by a ground wheel by sensing the number of rotations of the wheel and inputting the data into the calibration console, which converts the number of wheel rotations into distance and then acres or hectars, which accounts for the width of the seeder. Thus, the calibration console can also calibrate the weight of product dispensed per linear distance traveled by the seeder to give an application rate in lbs or kg per acre or hectare of land when taking into account the overall width of the seeder. In the alternative, a radar sensor as known in the art can be used to determine distance.

An example of a metering system comprising at least one meter 10 for use with air seeders for dispensing product from at least one product tank or hopper for delivery to the soil is shown in FIGS. 3a and 3b. The at least one meter and at least one hopper can be located directly on the air seeder or can be towed behind an air seeder on an air cart as shown in FIG. 1. Air seeders that can separately deliver two products, for example, seed and fertilizer, generally employ a primary pneumatic distribution system 160, as shown in FIGS. 3a and 3b, which may deliver metered seed and fertilizer separately from separate product tanks or hoppers 140 through one of two sets of primary distribution lines 162, 164. This arrangement is commonly referred to as a "double shoot" and allows for both products to be simultaneously, but separately, applied to a field.

Alternatively, it is understood that a metering system may also comprise a primary pneumatic distribution system of a "single shoot" configuration, where only one product tank or hopper is involved and only one set of primary distribution lines is needed.

With reference now to FIGS. 3a and 3b, meter 10 includes volumetric meter roller 100 which may be geared to the wheels of the air seeder trailer or, if carried on a separate product dispensing cart, to the wheels of the cart, and can be set to dispense a fixed volume of product per unit of linear distance traveled by the air seeder. In the embodiment shown in FIGS. 3a and 3b, meter 10 comprises volumetric meter roller 100 having an axial bore therethrough. Meter drive shaft 108, having roller sprocket 109 at one end, is inserted into the axial bore and when meter roller 100 is inserted through aperture 110 and mounted at the bottom of hopper 140, roller sprocket 109 meshes with agitator sprocket 112. Agitator sprocket 112 is attached to the end of agitator shaft 114 and in this embodiment is geared to the wheels of either the air seeder trailer or product dispensing cart (not shown).

Meter 10 further comprises meter rotation sensor 120 which actually senses the number of rotations of the meter drive shaft 108 by sensing sensor sprocket 111, which is attached to shaft 108, and hence senses the number of rotations of meter roller 100. Meter 10 may also comprise a means for rotating the meter drive shaft 108 such as a crank or handle (not shown) which can be used to manually turn the meter drive shaft 108 to dispense a unit of product from the hopper for collection in a container such as a pan or bag (generally located below the meter roller) so that the unit of product can be weighed in order for the operator to ultimately calibrate the number of rotations needed to dispense X lbs (or kg) of product per acre (or hectare) of land to be seeded.

Figure 4:
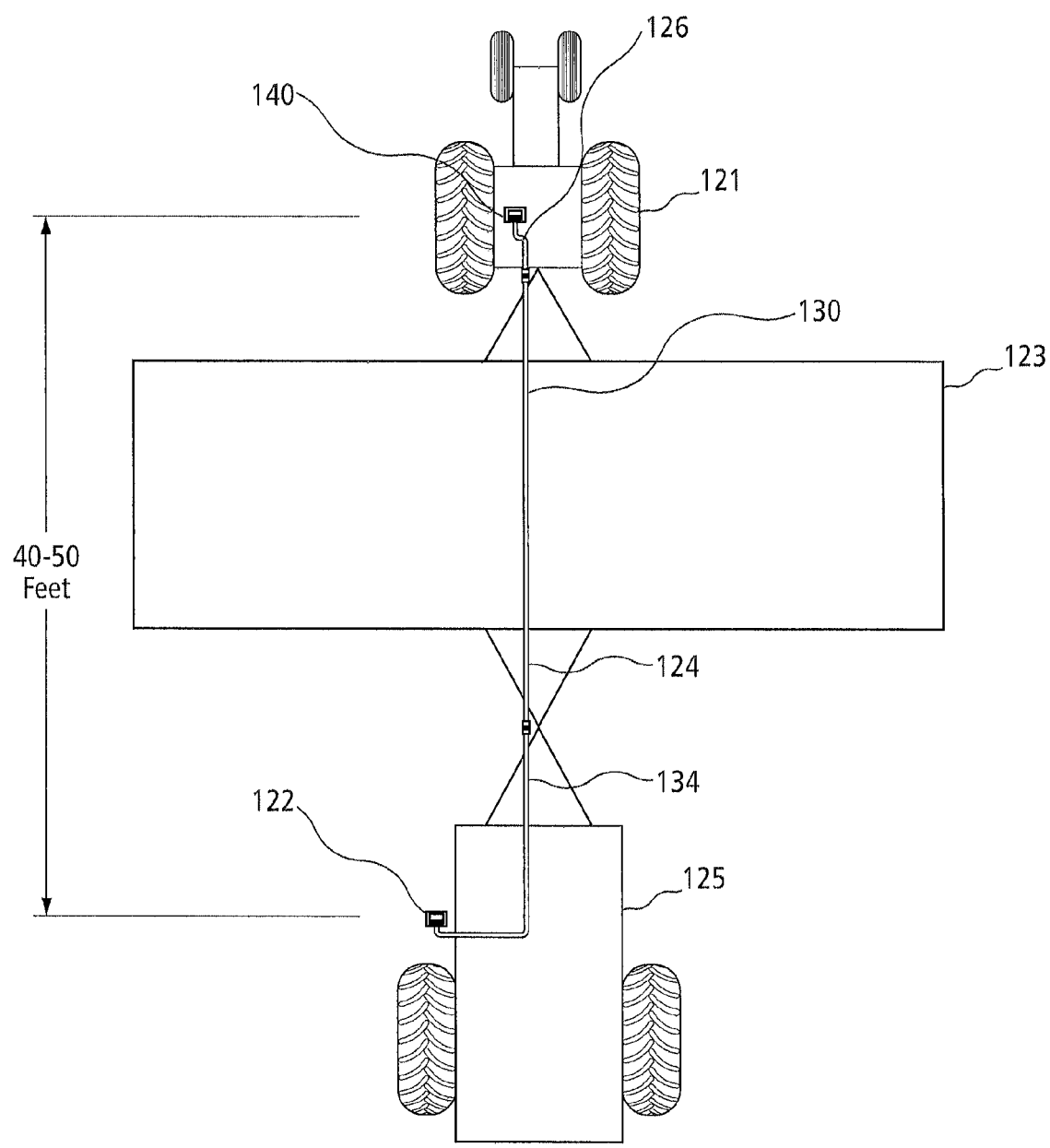
FIG. 4 shows an electrical overview of another embodiment of the invention.
Figure 5:
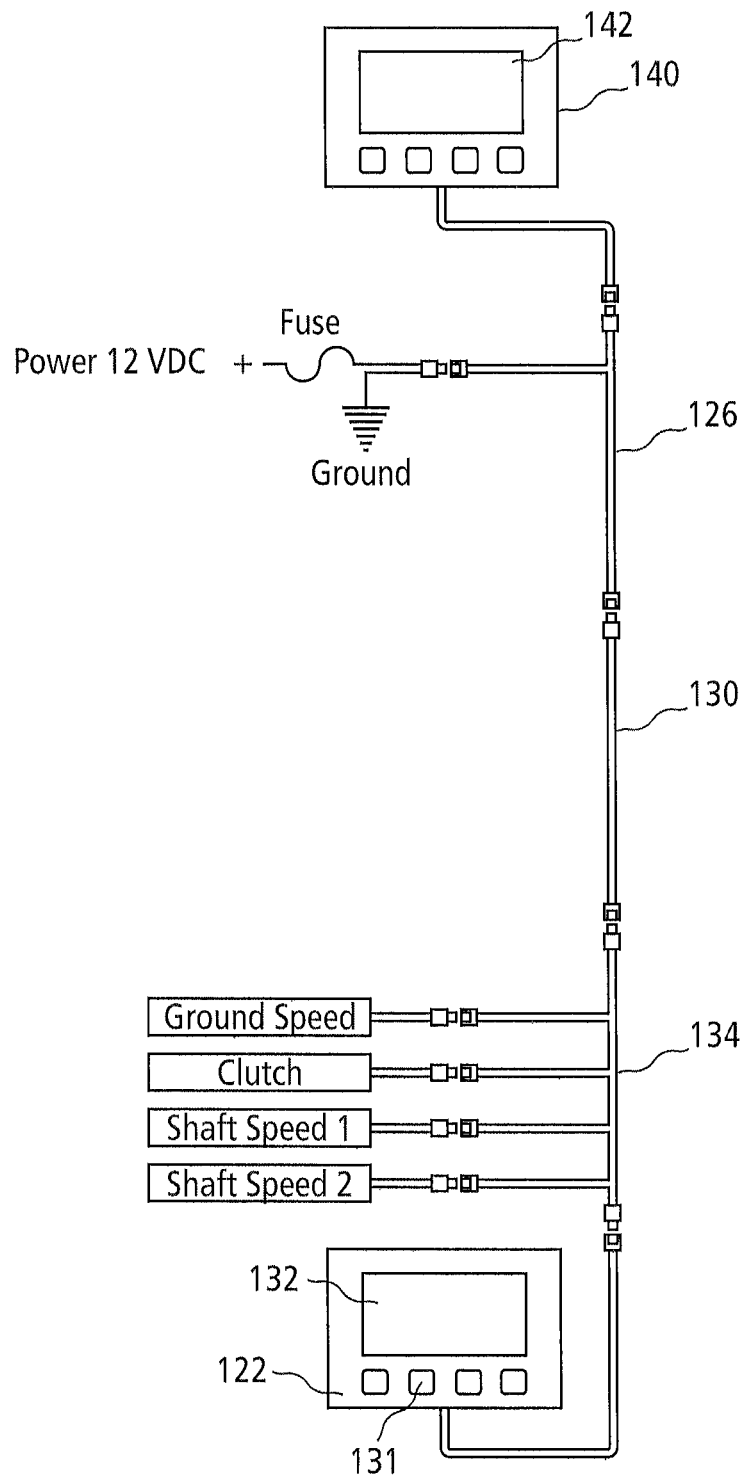
FIG. 5 shows an electrical harness of the other embodiment of the invention.

FIGS. 4 and 5 are overviews of another embodiment of the invention. A tractor 121 is shown towing a tool bar 123, which may comprise a plurality of ground openers (not shown), collectively referred to as a seeder. Towed behind the tool bar 123 is an air cart 125 for providing at least one product, such as seed and/or fertilizer, to the tool bar 123. The air cart 125 has a metering system having at least one meter, such as the metering system shown in FIG. 3a.

A calibration console 122 is provided comprising an input pad 131 and a screen 133. The calibration console 122 is provided in a first position at or near the air cart 125 and the metering system. The calibration console 122 can be used to calibrate the metering system, setting the feed rate and/or dispensing rate of the product, at or near the metering system where the calibration console 122 is positioned.

A monitoring console 140 having a display 140 can also be provided at a second position at or near the tractor 121 and in one embodiment, the monitoring console 140 can be provided in a cab of the tractor 121. The monitoring console 140 can allow a user operating the tractor 121 to monitor the feed rate and/or dispensing rate of the product; typically by displaying the feed rate and/or dispensing rate of the product on the display 142 of the monitoring console 140. The monitoring console 140 can also allow the operator to control a number of other functions related to the monitoring and/or control of the seeder. In a further embodiment, the monitoring console 140 can allow an operator to adjust the feed rate and/or dispensing rate of the product from the cab of the tractor 121, even while the seeder is in use dispending product. In one embodiment, the monitoring console 140 may have all the functionality of the calibration console 122 and in addition, provide a number of additional functions related to monitoring and/or controlling the operation of an air seeder. In another embodiment, the monitoring console 140 may not have the functionality of the calibration console 122, requiring the user to calibrate the metering system using the calibration console 122, but can allow the user to monitor and/or control the rest of the operation of the air seeder using the monitoring console 140.

In one embodiment, the calibration console 122 could act as an interface to the monitoring console 140. The calibration of the metering system could be performed on the monitoring console 140 using the calibration console 122 as a remote connection to the monitoring console 140, but utilizing the processing capabilities of the monitoring console 140 to perform the necessary processes and calculations. This can allow the processing requirements of the calibration console 122 to be greatly reduced.

The calibration console 122 can be electrically connected at the first position to an electrical harness 124, which may comprise a tractor harness 126, a toolbar harness 130 and an air cart harness 134. The monitoring console 140 can also be electrically connected to the electrical harness 124 at the second position.

In this manner, the metering system of the air cart 125 can be calibrated using the calibration console 122 located at or near the metering system and then the operation of the seeder can be monitored and/or controlled during use by an operator from the cab of the tractor 121 using the monitoring console 140. This allows different devices to be used for the calibration console 122 and the monitoring console 140. In one embodiment, the monitoring console 140 with its additional functionality to monitor and/or control the operation of the air seeder may be a more complex and/or expensive device than the calibration console 122, while the calibration console 122 with its more limited functional requirements can be a simpler and/or less expensive device.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A method for an operator to conveniently calibrate a metering system that dispenses at least one product to a seeder towed by a farm vehicle for the application of the at least one product from the seeder into or on the ground, comprising:
    providing in a first position a first console having an input device, the first position located at or near the metering system;
    calibrating the meter system by:
        for each of the at least one product, dispensing a unit of the product from the metering system into a container and weighing the unit of product dispensed, and
        inputting the weight of the unit of product into the first console located at the first position using the input device; and
    providing a microprocessor to calculate the dispensing rate of the product or the application rate of the product or both based on the weight of the unit of product inputted into the first console.

2. The method as claimed in claim 1, wherein the first console is moveable.

3. The method as claimed in claim 2 further comprising after calibrating the meter system, moving the first console to a second position.

4. The method as claimed in claim 3 wherein the second position is in a cab of the farm vehicle.

5. The method as claimed in claim 4 further comprising after calibrating the meter system and moving the first console to the second position, using the first console to monitor at least one of the: the dispensing rate and the application rate of the at least one product.

6. The method as claimed in claim 5 further comprising adjusting at least one of: the dispensing rate and the application rate of the at least one product using the first console located at the second position.

7. The method as claimed in claim 1 further comprising providing a second console at a second position, said second position being located at or near the cab of the farm vehicle.

8. The method as claimed in claim 7, wherein the second console is located in the cab of the farm vehicle and operable for displaying at least one of: the dispensing rate and the application rate of the at least one product.

9. The method as claimed in claim 8 further comprising using the second console to adjust at least one of: the dispensing rate and the application rate of the at least one product.

10. The method as claimed in claim 7, wherein the first console is moveable.

11. The method as claimed in claim 10, wherein the first console acts as an interface to the second console.

12. The method as claimed in claim 10, wherein the microprocessor is operably associated with the second console.

13. The method as claimed in claim 10, wherein the microprocessor is operably associated with the first console.

14. The method as claimed in claim 10, wherein each of the first and second console has its own microprocessor operably connected thereto.

15. The method as claimed in claim 1, wherein the microprocessor is operably associated with the first console.

* * * * *